United States Patent
Demeter et al.

(10) Patent No.: US 9,584,962 B2
(45) Date of Patent: Feb. 28, 2017

(54) SYSTEM AND METHOD FOR MOBILE LOCALIZATION USING FAKE LOCATION UPDATES

(75) Inventors: Hunor Demeter, Budapest (HU); Lorant Farkas, Budapest (HU)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 14/404,104

(22) PCT Filed: May 30, 2012

(86) PCT No.: PCT/EP2012/060098
§ 371 (c)(1),
(2), (4) Date: Jan. 8, 2015

(87) PCT Pub. No.: WO2013/178253
PCT Pub. Date: Dec. 5, 2013

(65) Prior Publication Data
US 2015/0119072 A1    Apr. 30, 2015

(51) Int. Cl.
*H04W 24/00* (2009.01)
*H04W 4/02* (2009.01)
*H04W 4/00* (2009.01)
*H04W 60/00* (2009.01)

(52) U.S. Cl.
CPC ............ *H04W 4/02* (2013.01); *H04W 4/001* (2013.01); *H04W 4/021* (2013.01); *H04W 4/028* (2013.01); *H04W 60/00* (2013.01)

(58) Field of Classification Search
CPC ....... H04W 4/02; H04W 4/021; H04W 4/028; H04W 4/001; H04W 60/00
See application file for complete search history.

(56) References Cited

U.S. PATENT DOCUMENTS

| 6,785,287 B1* | 8/2004 | Honkala | H04W 68/00 370/310.2 |
| 2007/0233695 A1* | 10/2007 | Boudreau | G01C 21/20 |

(Continued)

FOREIGN PATENT DOCUMENTS

| EP | 2 028 885 A1 | 2/2009 |
| EP | 2 267 980 A1 | 12/2010 |

(Continued)

OTHER PUBLICATIONS

International Search Report and Written Opinion dated Jun. 3, 2013 corresponding to International Patent Application No. PCT/EP2012/060098.

Gayathri Chandrasekaran et al., "Tracking Vehicle Speed Variations by Warping Mobile Phone Signal Strengths", 2011 IEEE International Conference on Pervasive Computing and Communication, Mar. 21-25, 2011, pp. 213-221.

(Continued)

*Primary Examiner* — Erin File
(74) *Attorney, Agent, or Firm* — Squire Patton Boggs (US) LLP

(57) ABSTRACT

A method including defining mappings between coordinates of interest and fake location areas. The method may further include providing an application to a terminal, and distributing the mappings to the terminal. The method may further include receiving a location update generated from the terminal, wherein the location update is based upon a fake location area, and determining location information of the terminal based upon the location update.

8 Claims, 5 Drawing Sheets

(56) References Cited

U.S. PATENT DOCUMENTS

| | | | | |
|---|---|---|---|---|
| 2008/0076425 | A1* | 3/2008 | Khetawat | H04W 88/12 455/436 |
| 2011/0263290 | A1* | 10/2011 | Nam | H04W 52/0225 455/552.1 |
| 2012/0108262 | A1* | 5/2012 | Nelkenbaum | H04W 24/08 455/456.1 |
| 2013/0150029 | A1* | 6/2013 | Jeong | H04W 8/06 455/432.3 |
| 2013/0204907 | A1* | 8/2013 | Alonso Alarcon | G06F 17/30362 707/803 |
| 2015/0319581 | A1* | 11/2015 | Dicke | G01C 21/362 455/457 |

FOREIGN PATENT DOCUMENTS

| | | |
|---|---|---|
| WO | WO 03/041031 A1 | 5/2003 |
| WO | WO 03/105501 A1 | 12/2003 |

OTHER PUBLICATIONS

Chandrasekaran et al., "Vehicular Speed Estimation using Received Signal Strength from Mobile Phones", UbiComp '10, Sep. 26-29, 2010, Copenhagen, Denmark.

Android Developers, "Location Manager", https://developer.android.com/reference/android/location/LocationManager.html#getLastKnownLocation(java.lang.String. Last visited Oct. 13, 2016.

Android Developers, "Location and Maps", http://developerandroid.com/guide/topics/location/index.html. Last visited Oct. 13, 2016.

EventStudio System Designer 6, http://www.eventhelix.com/realtimemantra/telecom/GSM_Location_Update_Sequence_Diagram.pdf, Jun. 12, 2014.

Wikipedia, https://en.wikipedia.org/wiki/Short_Message_Service_technical_realisation_(GSM). Last visited Oct. 13, 2016.

Hotes, "An Update on Location Privacy", https://web.archive.org/web/20120718003002/http:/www.locationlabs.com/news/blog/an-update-on-location-privacy/, Aug. 17, 2011.

* cited by examiner

SYSTEM AND METHOD FOR MOBILE LOCALIZATION USING FAKE LOCATION UPDATES

BACKGROUND

Field

Embodiments of the invention relate to location area updating using telecommunication signaling protocols, such as, but not limited to, Random Location Area Update (LAU) and/or Random Routing Area Update (RAU).

Description of the Related Art

Applications using technology such as Java Card, for example, can determine, through a mobile equipment—SIM (ME-SIM) interface, a visible set of base stations of a telecommunication network. Through server-side communication, these applications can provide location information on the whereabouts of the mobile equipment. Java Card refers to technology that allows Java applets to run on a SIM card. Java applets may be installed remotely to a SIM card using technology referred to as over-the-air (OTA) provisioning.

One telecommunication signaling protocol that may provide location information is Random Location Area Update (LAU). Within a Circuit Switched (CS) network, a mobile terminal may initiate LAU to refresh a location of the mobile terminal when crossing the border of two location areas. Both active and idle mobile terminals may initiate LAU.

Another telecommunication signaling protocol that may provide location information is Random Routing Area Update (RAU). RAU may be used within a packet switched (PS) network, and RAU operates in a similar manner as LAU. A mobile terminal may initiate RAU to refresh a location of the mobile terminal when crossing the border of two routing areas.

In general, signaling events communicated by the signaling protocols can be used for detecting the position of mobile terminals. Passive localization methods use signaling events without interfering with normal network operation. An example of a passive localization method is the processing of LAU or RAU events. WO 03/041031 A1 presents a solution for passive localization using LAU events.

On the other hand, active localization methods initiate message exchange with mobile terminals to obtain position information. An example of active localization is paging.

Additionally, "Tracking Vehicular Speed Variations by Warping Mobile Phone Signal Strengths" by Chandrasekaran et. al., 2011, IEEE International Conference on Pervasive Computing and Communications (PerCom), describes a solution to detect random locations by collecting signal strength information.

SUMMARY

One embodiment is directed to a method including defining mappings between coordinates of interest and fake location areas. The mapping may further include a measure of the probability that a mobile terminal is physically at a coordinate of interest or the accuracy of a location detection. The method may further include providing an application to a terminal, and distributing the mappings to the terminal. The method may further include receiving a location update generated from the terminal, wherein the location update is based upon a fake location area, and determining location information of the terminal based upon the location update.

Another embodiment may include an apparatus which may include at least one processor and at least one memory including computer program code. The at least one memory and the computer program code are configured, with the at least one processor, to cause the apparatus at least to define mappings between coordinates of interest and fake location areas, to provide an application to a terminal, to distribute the mappings to the terminal, to receive a location update generated from the terminal, wherein the location update is based upon a fake location area, and to determine location information of the terminal based upon the location update.

Another embodiment may include a computer program, embodied on a computer readable medium. The computer program may be configured to control a processor to perform a process including defining mappings between coordinates of interest and fake location areas, providing an application to a terminal, distributing the mappings to the terminal, receiving a location update generated from the terminal, wherein the location update is based upon a fake location area, and determining location information of the terminal based upon the location update.

Another embodiment is directed to an apparatus including means for defining mappings between coordinates of interest and fake location areas, means for providing an application to a terminal, means for distributing the mappings to the terminal, means for receiving a location update generated from the terminal, wherein the location update is based upon a fake location area, and means for determining location information of the terminal based upon the location update.

Another embodiment may include a method including receiving, by a terminal, an application, receiving, by the terminal, mappings between coordinates of interest and fake location areas, and generating, by the terminal, a location update, wherein the location update is based upon a fake location area.

Another embodiment may include an apparatus comprising at least one processor and at least one memory including computer program code. The at least one memory and the computer program code may be configured, with the at least one processor, to cause the apparatus at least to receive an application, receive mappings between coordinates of interest and fake location areas, and generate a location update, wherein the location update is based upon a fake location area.

Another embodiment may include a computer program, embodied on a computer readable medium. The computer program may be configured to control a processor to perform a process including receiving, by a terminal, an application, receiving, by the terminal, mappings between coordinates of interest and fake location areas, and generating, by the terminal, a location update, wherein the location update is based upon a fake location area.

Another embodiment may include an apparatus including means for receiving an application, means for receiving mappings between coordinates of interest and fake location areas; and means for generating a location update, wherein the location update is based upon a fake location area.

BRIEF DESCRIPTION OF THE DRAWINGS

For proper understanding of the invention, reference should be made to the accompanying drawings, wherein.

DETAILED DESCRIPTION

Figure 1:
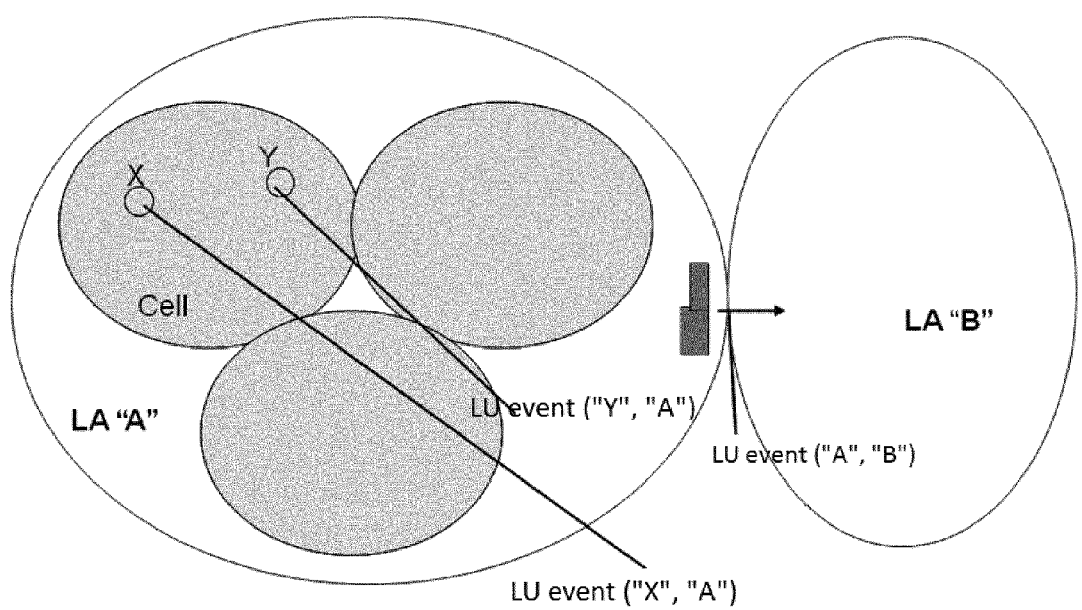
FIG. 1 illustrates a scenario, according to one embodiment, where location update events are generated based upon fake location areas.

It will be readily understood that the components of the invention, as generally described and illustrated in the figures herein, may be arranged and designed in a wide variety of different configurations. Thus, the following detailed description of the embodiments of a method, an apparatus, and a computer program product for location area updating as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings, and embodiments of this invention, and not in limitation thereof.

The use of passive localization methods to detect the position of mobile terminals may be able to provide position information for a large number of terminals. However, passive localization methods may only be able to provide position information of limited accuracy (e.g. which cell a terminal is located in) at predefined locations (i.e., position information may be provided at a time of cell change by the terminal, position information may be provided at a time of location area change by the terminal, etc.).

On the other hand, use of active localization methods to detect the position of mobile terminals may be able to give precise location information. However, active localization methods may only provide location information for a subset of terminals (all terminals cannot be polled at all times, as such polling may congest the network and/or drain terminal batteries).

Certain embodiments of the invention may provide location information without generating billable events directed to the end user. Certain embodiments of the invention may provide location information without requiring active polling/paging from a network side. Certain embodiments of the invention may provide control over the location of where an update location event is triggered. Certain embodiments of the invention may provide control over the terminals which take part in the measurements in a given location area. Certain embodiments of the invention may conserve the battery of a terminal battery, wherein a cardlet of the terminal only triggers an event when appropriate. It should be noted that advantages of the present invention are not limited to those discussed above and other advantages may be realized according to embodiments of the invention.

A user may be interested in receiving location information corresponding to a finite number of coordinates (fixed or variable). For example, a transportation agency user may be interested in receiving location information corresponding to speed measurement points. As another example, a taxi cab dispatcher may be interested in receiving location information corresponding to the locations of terminals belonging to taxi drivers. These coordinates seldom coincide with cell borders or location area borders.

In view of the above, in one embodiment, a server side application may define a mapping between the coordinates of interest and "fake" location areas. Whenever the terminal detects that its location is close to one of the coordinates of interest, the terminal generates a "fake" location update. By mapping the "fake" old location area—new location area pair with the coordinates of interest, the server side application can determine the location of the terminal. In certain embodiments, the mapping may further include a measure of the probability that a terminal is physically at a coordinate of interest or the accuracy of a location detection.

As a result, the terminal does not need to send any information via SMS or GPRS, so no billable event is generated on behalf of the end user (i.e., the end user will not have to pay). Further, location information of terminals may be obtained without requiring a network to poll terminals for their positions. For example, certain embodiments of the invention may include some or all of the following steps:

1) In the first step, a server side application may define the coordinates of interest and attach a fake location area to each coordinate of interest (i.e., the server side application defines a mapping between the coordinates of interest and fake location areas).

For example, referring to FIG. 1, a server side application may define coordinates of interest and define mappings between the coordinates of interest and fake location areas X and Y.

Location area codes (LAC) for designating location areas may be 16 bits. Therefore, the total number of location areas may be 65535. Typically, even within large countries, an operator does not use more location areas than 1000. Therefore, an operator may safely assume that at least half of a total number of location areas can be used as "fake" location areas.

2) In the second step, applications may be remotely provisioned to a number of terminals. The number of terminals may depend on the application. For instance, a national transportation agency may need to remotely provision enough terminals so that the agency can determine the flow of vehicles on major roads in a country. On the other hand, a taxi dispatcher might only be interested in the location of the terminals of taxi drivers, and thus require remote provisioning of fewer terminals.

3) In the third step, the defined mappings (between coordinates of interest and the fake locations) are distributed to the terminals. In certain client environments, the terminal may not have enough storage for several thousands of mappings. Therefore, in some embodiments, the distribution of the mappings could be performed in an adaptive manner, as described below. In other cases, the terminal may have access to sufficient storage (e.g. Javacard 2.2.2 may allow an applet to interface with an external storage device). As such, in some embodiments, all of the mappings may be stored.

As described above, in some embodiments, the distribution of mappings could be performed in an adaptive manner. The application may update coordinates of interest corresponding to when network-side events are generated. Network-side events may include "normal" random location updates, periodic location updates, or phone-triggered location updates. A "normal" or periodic location update, for example, might be the triggering of an update of the coordinates of interest from a new location area where a terminal has just been registered. A phone-triggered location update, for example, might be the triggering of an update of the coordinates of interest from location areas that are the closest neighbours to the location area in which a phone is currently residing.

Figure 2:
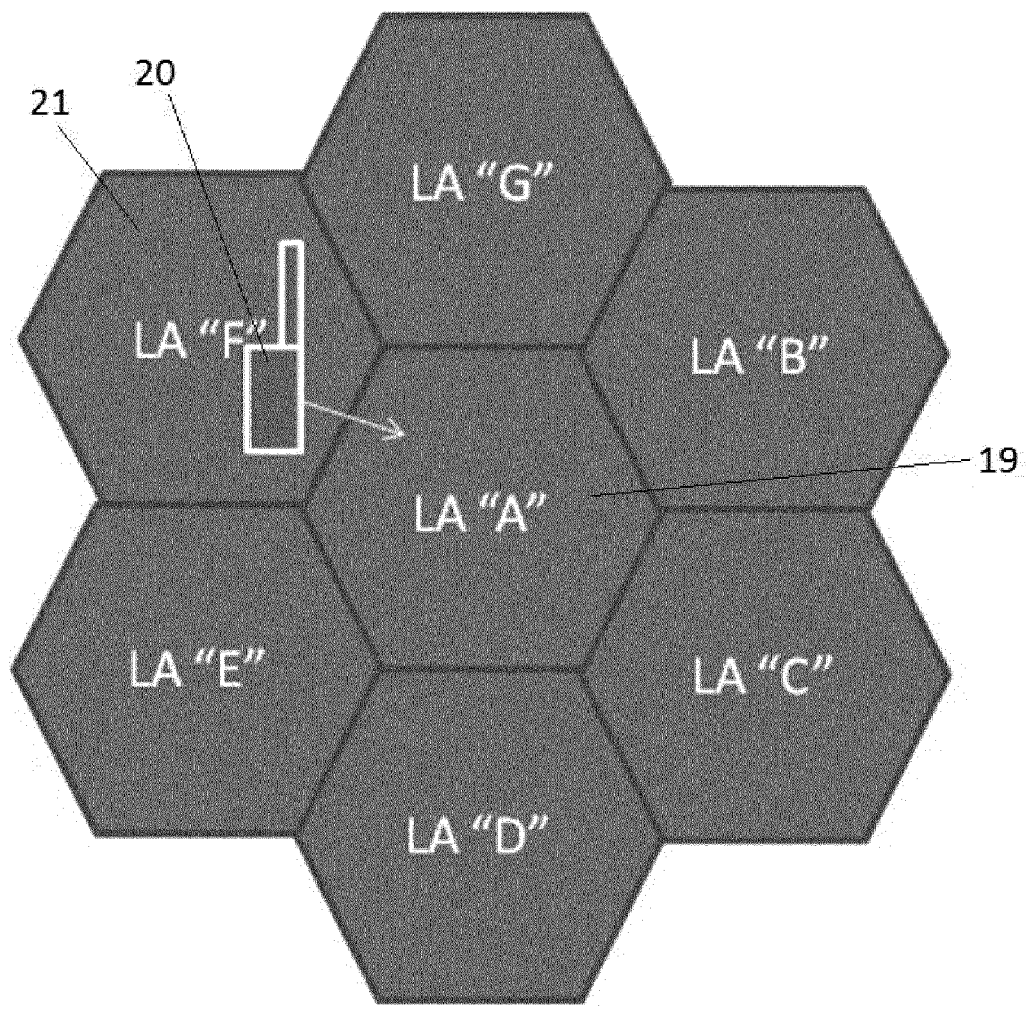
FIG. 2 illustrates a scenario, according to one embodiment, where some coordinates of interest are uploaded to a terminal while other coordinates of interest are erased.

Referring to FIG. 2, in some embodiments, the storage of mappings may be kept low by uploading certain coordinates of interest while erasing other coordinates of interest. Mobile 20 may cross from location area 21 (corresponding to location area "F") to location area 19 (corresponding to location area "A"). When mobile 20 crosses the border between location area "F" and location area "A," coordinates of interest from location areas "G," "B," "C," "D," and "E" may be uploaded to a terminal. Other coordinates of interest outside of "A," "B," "C," "D," "E," "F," and "G" may be erased.

4) In the fourth step, the terminal may start executing measurements. A coordinate of interest may represent a physical location in a coordinate reference system. On the other hand, a measurement point may be, but is not limited to, a data set composed of many measurements taken at a location within a network infrastructure. For example, a measurement point may be a data set comprising a mobile country code, a mobile network code, a location area code, and a cell identifier. Upon gaining information during a measurement phase or from an external source, the terminal may determine whether a given measurement point corresponds to a coordinate of interest. Whenever the terminal identifies/detects a measurement point corresponding to a coordinate of interest, the terminal looks up the mapped fake location area associated with the coordinate of interest and generates a location update (LU) using parameters that indicate movement from "fake" location area to real location area. The terminal may be kept in the current location area, without an update in home location register (HLR) or visitor location register (VLR). The mobile switching centre (MSC) may be able to detect the event (tested in lab environment).

For example, referring again to FIG. 1, a terminal may generate a location update using parameters that indicate arrival into "fake" location X (within real location area A). The terminal may also generate a location update using parameters that indicate arrival into "fake" location Y (also within real location A).

5) In the fifth step, the server side application creates an inverse mapping and determines the location information of the respective terminal. When events are extracted as location update events, the terminal identity will be naturally encrypted.

Figure 4:
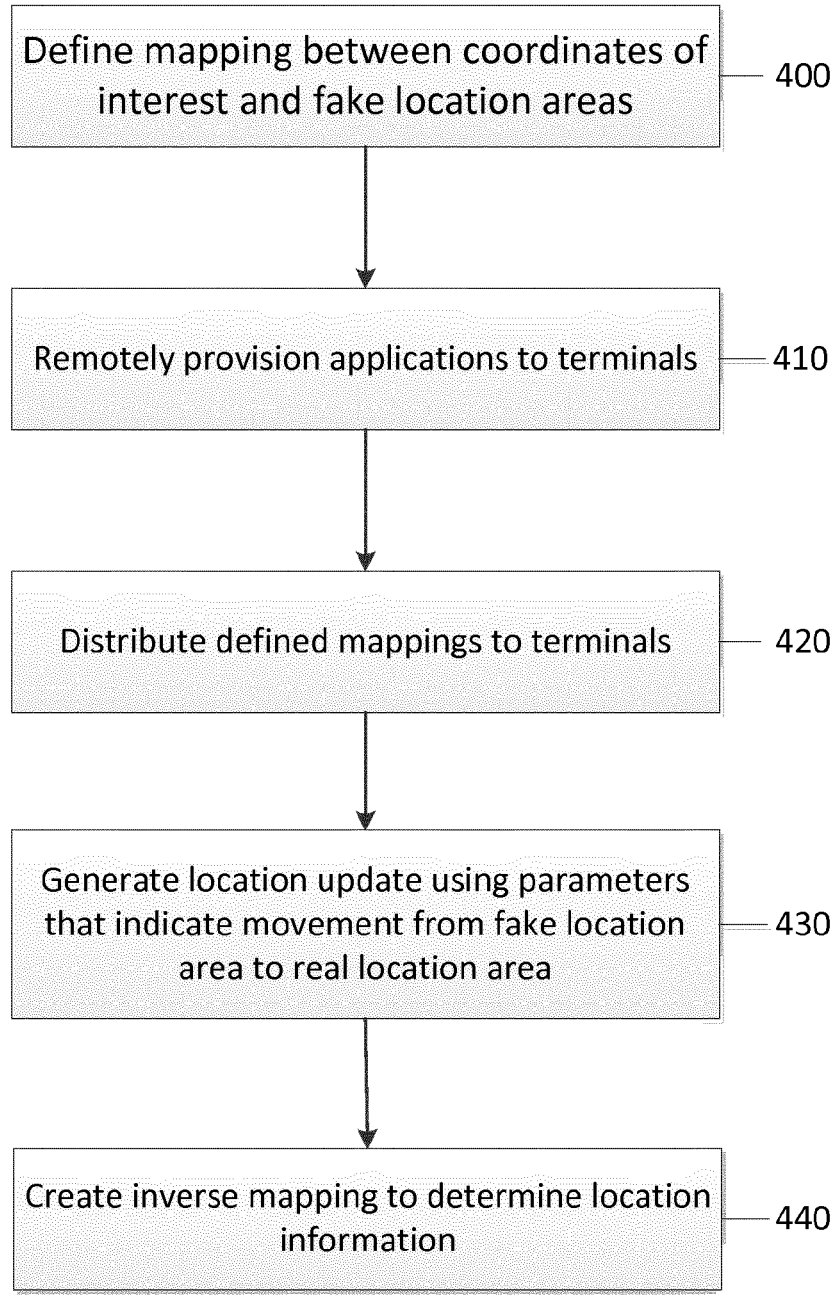
FIG. 4 illustrates a flow diagram of a method according to one embodiment.

FIG. 4 illustrates a logic flow diagram of a method according to one embodiment. In an embodiment, the method illustrated in FIG. 4 includes, at 400, defining a mapping between coordinates of interest and fake location areas and, at 410, remotely provisioning applets to terminals. At 420, the method includes distributing the defined mappings to the terminals and, at 430, generating location updates using parameters that indicate movement of a terminal from a fake location area to a real location area. The method may also include, at 440, creating an inverse mapping to determine location information of the terminal.

If there are enough non-utilized location areas that can be used as "fake" location areas, then these non-utilized location areas may be used as "fake" location areas. However, in certain embodiments, if there are not enough non-utilized location areas for use as "fake" location areas, then the number of non-utilized location areas can be extended with a subset of the utilized location areas. For example, the number of non-utilized location areas can be extended with a subset of the utilized location areas that meet the condition that they are not the direct neighbour of the location area where the terminal is physically residing.

Figure 3:
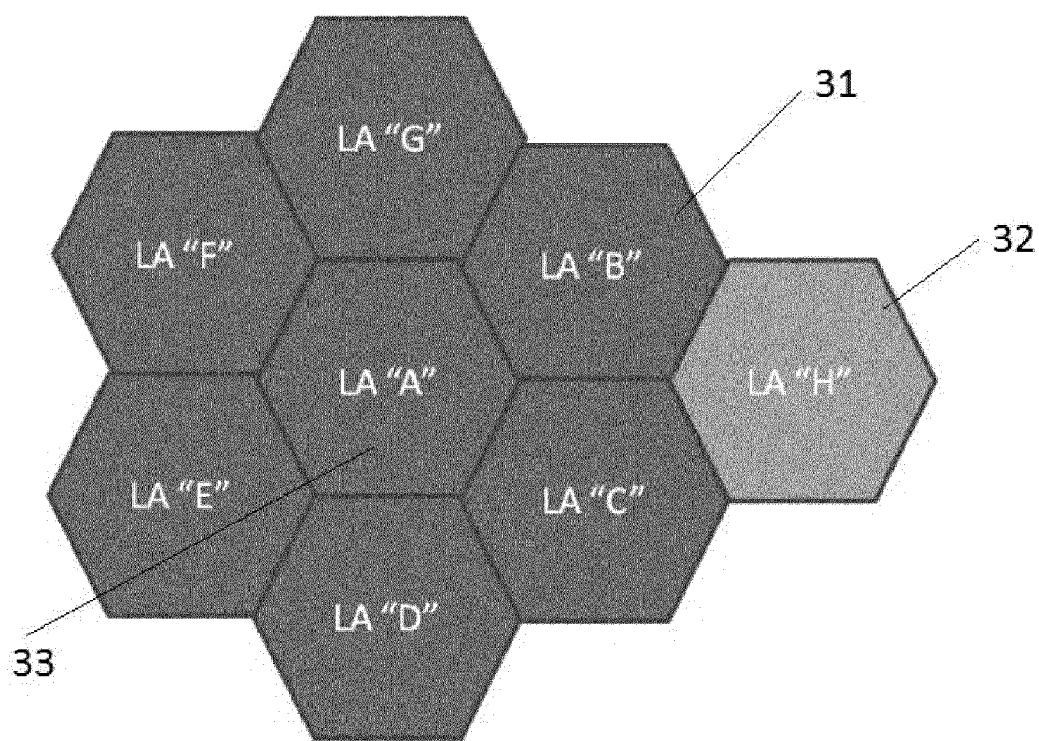
FIG. 3 illustrates, according to one embodiment, the use of real location areas as fake location areas.

For example, FIG. 3 shows location areas 31, 32, and 33, corresponding to location areas "B," "H," and "A," respectively. Coordinates of interest in location area B may not use location area H as a "fake" location area because location area H neighbors location area B. However, coordinates of interest in location area B may use location area E as a "fake" location area.

As another example, coordinates of interest in location area A may use location area H as a "fake" location area because location area A does not neighbour location area H. Because location area A does not neighbour location area H, a "real" location update will not occur between A and H.

Certain other embodiments may use real and fake location areas of other operator networks. As such, the number of available location areas may be extended.

Certain other embodiments may use routing areas as fake location areas. The use of fake location areas may generally be used with any location update protocol.

Certain other embodiments may use different triggers for generating fake location updates. For example, other embodiments may trigger by WLAN/Bluetooth ID, trigger by sensor value (temperature values, pollution level values, acceleration values, movement values, etc), trigger by calendar events (in meeting, meeting ended, etc), trigger by phone status (in-call, idle, just sent out SMS, just received SMS, running IM client, running web browser, phone on charger, phone battery nearly depleted, phone battery charge at a certain percentage), or any other information regarding a subscriber detected directly or indirectly by a phone.

Figure 5:
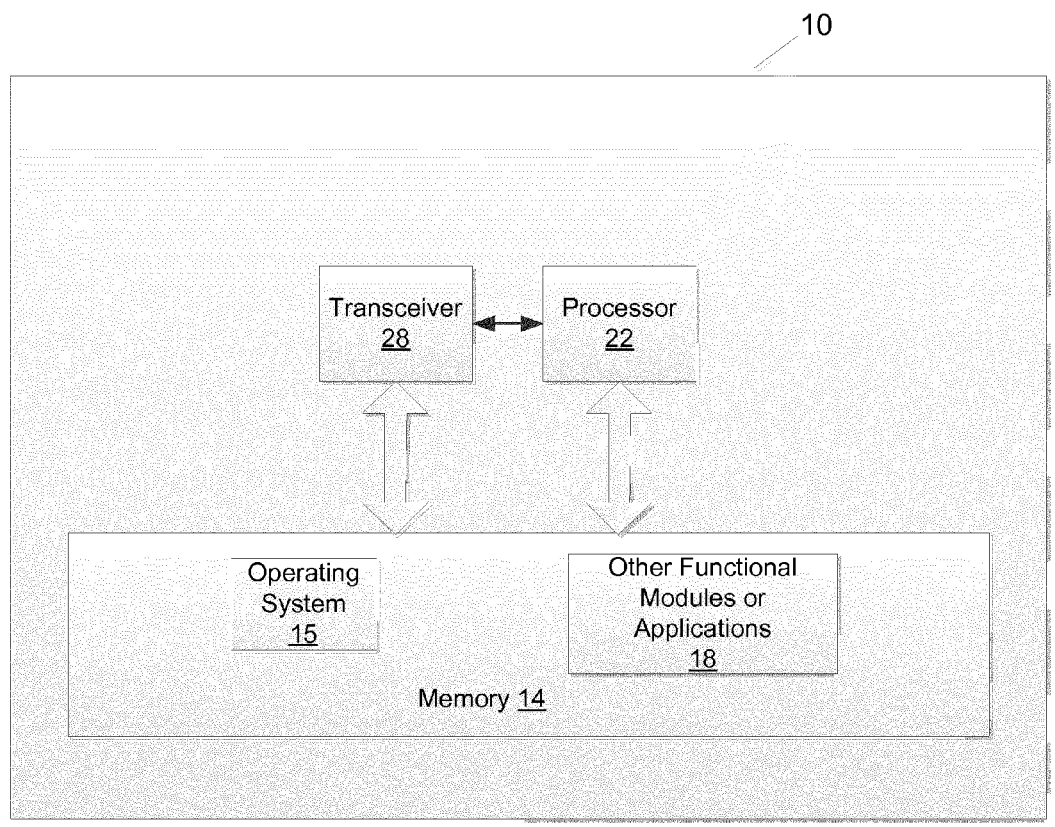
FIG. 5 illustrates an apparatus according to one embodiment.

FIG. 5 illustrates an apparatus 10 according to another embodiment. In an embodiment, apparatus 10 may be a server. In other embodiments, apparatus 10 may be a terminal.

Apparatus 10 includes a processor 22 for processing information and executing instructions or operations. Processor 22 may be any type of general or specific purpose processor. While a single processor 22 is shown in FIG. 5, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

As mentioned above, apparatus 10 may be a server. In this embodiment, apparatus 10 may be controlled by memory 14 and processor 22 to define mappings between coordinates of interest and fake location areas. Apparatus 10 may be further controlled by memory 14 and processor 22 to provide an application to a terminal. Apparatus 10 may be further controlled by memory 14 and processor 22 to distribute mappings to the terminal. Apparatus 10 may be further controlled by memory 14 and processor 22 to receive a location update generated from the terminal. In this example, the location update may be based upon a fake location area. In one embodiment, apparatus 10 is further controlled by memory 14 and processor 22 to determine location information of the terminal based upon the location update.

According to another embodiment, apparatus 10 may be a terminal. In this embodiment, apparatus 10 may be controlled by memory 14 and processor 22 to receive an application. Apparatus 10 may be further controlled by memory 14 and processor 22 to receive mappings between coordinates of interest and fake location areas. Apparatus 10 may then be further controlled by memory 14 and processor 22 to generate a location update. In this example, the location update may be based upon a fake location area.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   receiving, by a terminal, an application;
   receiving, by the terminal, mappings between coordinates of interest and fake location areas; and
   generating, by the terminal, a location update, wherein the location update is based upon one of the fake location areas.

2. The method according to claim 1, wherein the receiving of mappings by the terminal erases information from the terminal.

3. The method according to claim 1, wherein receiving of the application by the terminal is performed by remote provisioning.

4. An apparatus, comprising:
   at least one processor; and
   at least one memory including computer program code,
   the at least one memory and the computer program code are configured, with the at least one processor, to cause the apparatus at least to
   receive an application;
   receive mappings between coordinates of interest and fake location areas; and
   generate a location update, wherein the location update is based upon one of the fake location areas.

5. The apparatus according to claim 4, wherein the receiving of mappings erases information stored within the at least one memory.

6. The apparatus according to claim 4, wherein receiving of the application is performed by remote provisioning.

7. A computer program, embodied on a non-transitory computer-readable medium, the computer program configured to control a processor to perform a process, comprising:
   receiving, by a terminal, an application;
   receiving, by the terminal, mappings between coordinates of interest and fake location areas; and
   generating, by the terminal, a location update, wherein the location update is based upon one of the fake location areas.

8. The computer program, embodied on the non-transitory computer-readable medium, according to claim 7, wherein receiving of the application by the terminal is performed by remote provisioning.

* * * * *